METHOD OF PACKAGING MICROELECTRONIC DEVICES

Original Filed Dec. 30, 1963

INVENTOR
EDWARD A. CARACCIOLO
BY Jack M. Wiseman
ATTORNEY

3,431,637
METHOD OF PACKAGING MICROELECTRONIC DEVICES

Edward A. Caracciolo, Santa Clara, Calif., assignor, by mesne assignments, to Philco-Ford Corporation, a corporation of Delaware Original application Dec. 30, 1963, Ser. No. 334,332. Divided and this application Aug. 1, 1966, Ser. No. 581,407
U.S. Cl. 29—588 4 Claims
Int. Cl. B01j 17/00; H01l 1/10, 5/02

ABSTRACT OF THE DISCLOSURE

A packaged electronic device includes a body of insulating material having a cavity formed therein, and through which body extends a plurality of conductor leads. Lead portions extending into the cavity are in direct contact, through solder bonds, with a semiconductor device disposed within the cavity. A cover sealed to the body completes the package. The package is assembled by forming meltable prominences over the terminal areas of a plurality of semiconductor devices and forming recesses in a series of package units for exposing conductor lead arrays embedded in the respective package units. The devices respectively are disposed in individual recesses of the package units with the meltable prominences in direct contacting engagement with associated conductor lead arrays. The prominences are melted to bond the semicondcutor devices directly to the associated lead arrays, and the recesses are covered to seal the devices within the package units. The package units are then separated to form individual units of packaged devices.

This is a division of application Ser. No. 334,332, filed Dec. 30, 1963, and now abandoned.

The present invention relates to a method of and product for packaging semiconductive and microelectronic devices.

Heretofore, the processes for packaging semiconductive and microelectronic devices did not lend themselves to large multiple procedures, but, rather, were restricted and limited to the number of packages that could be produced at a given time.

An object of the present invention is to improve the method of packaging semiconductive and microelectronic devices.

Another object of the present invention is to provide an improved package for semiconductive and microelectronic devices.

Another object of the present invention is to facilitate the packaging of semiconductive and microelectronic devices without sacrificing reliability and usabilty.

Another object of the present invention is to improve the production output and efficiency for packaging semiconductive and microelectronic devices.

Another object of the present invention is to provide a continuous feed arrangement in the packaging of microelectronic and semiconductive devices.

Another object of the present invention is to provide a method for packaging semiconductive and microelectronic devices in higher multiples.

Another object of the present invention is to provide a method for packaging semiconductive and microelectronic devices wherein a serial production system is employed.

Another object of the present invention is to provide an arrangement for packaging semiconductive and microelectronic devices wherein the package leads adhere directly to the semiconductive device.

Another object of the present invention is to provide a method for packaging microelectronic and semiconductor devices in which the package devices can be produced more economically without sacrificing reliability or usability.

Another object of the present invention is to provide a method for packaging microelectronic and semiconductive devices wherein there is accuracy and precision in the advancement of packaging material.

Other and further objects and advantages of the present invention will be apparent to one skilled in the art from the following description taken in conjunction with the accompaying drawings, in which.

Figures 1, 2, 3, 4, 5, 6, 7, 8, 9, 10, 11, 12, 13:
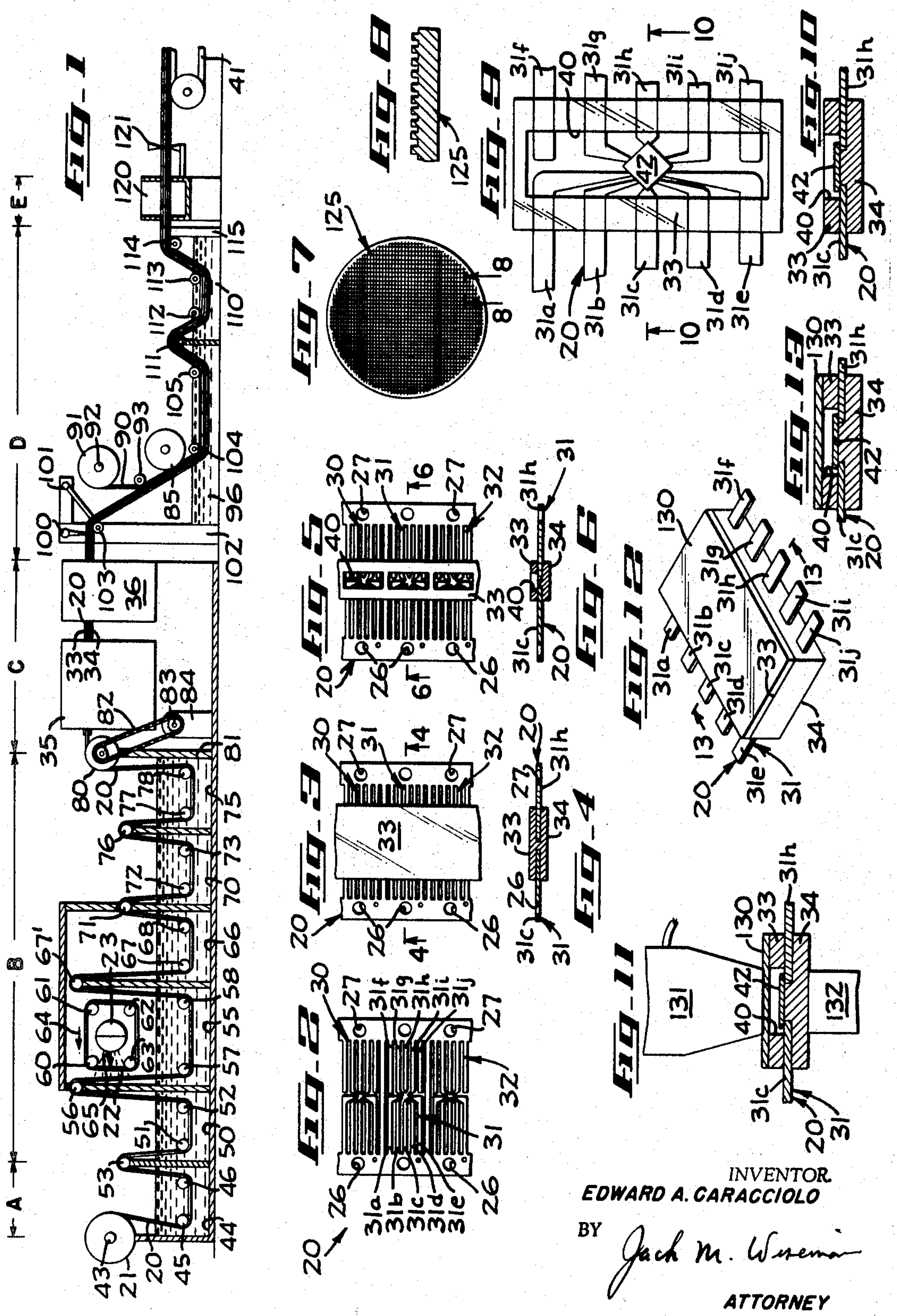
FIG. 1 is a diagrammatic illustration of a series of steps and apparatus employed in packaging microelectronic and semiconductive devices according to the present invention.
FIG. 2 is a plan view of a novel metal strip or ribbon employed in the present invention.
FIG. 3 is a plan view showing the metal strip illustrated in FIG. 2 sandwiched between strips of insulating material.
FIG. 4 is a vertical sectional view taken along line 4—4 of FIG. 3.
FIG. 5 is a plan view of the metal strip sandwiched between the strips of insulating material after a portion of the insulating material has been selectively removed to provide access to the conductor lead structures of the metal strip.
FIG. 6 is a vertical sectional view taken along line 6—6 of FIG. 5.
FIG. 7 is a plan view of a plurality of semiconductive devices on a wafer.
FIG. 8 is a vertical sectional view taken along line 8—8 of FIG. 7.
FIG. 9 is a plan view of a semiconductive device assembled with a metal strip sandwiched between the strips of insulating material and particularly illustrating the conductor lead structure in direct contact engagement with the semiconductive device.
FIG. 10 is a vertical section view taken along line 10—10 of FIG. 9.
FIG. 11 is a schematic diagram of an apparatus for applying a cap to the semiconductive device package units of the present invention.
FIG. 12 is a perspective view of a semiconductive device packaged in accordance with the present invention.
FIG. 13 is a section view taken along line 13—13 of FIG. 12.

Initially, metal strip 20 (FIG. 1) is wound around a spool 21. At station A (FIG. 1) the metal strip 20 is drawn from the spool 21. As the metal strip 20 is removed from the spool 21, it is prepared for receiving thereon photosensitive material.

At station B, photosensitive material is applied to the metal strip 20 and an endless masking tape or belt 22 is disposed adjacent to the metal strip 20 with the photosensitive material applied thereto. The endless masking tape 22 is formed with a predetermined, successive arrays of patterns. The metal strip 20 with the photosensitive material applied thereto is exposed to ultraviolet light through the endless masking tape or belt 22. A source 23 produces the ultra-violet radiation. Subsequently, the exposed photosensitive metal strip 20 is subjected to an etchant of a suitable solution whereupon formed on the metal strip 20 are a series of perforations 26 and 27 (FIG. 2) and conductor lead structures 30–32.

The metal strip 20 is thereupon advanced from station B (FIG. 1) through station C where the metal strip 20 is sandwiched between or imbedded within upper and lower insulating or dielectric strips 33 and 34 (FIGS. 3 and 4). Toward this end, the metal strip 20 disposed between the insulating strips 33 and 34 is advanced to a suitable heating or firing furnace 35 (FIG. 1) and later to an annealing chamber 36 with the result the metal strip 20 is imbedded between the insulating strips 33 and 34 to form a sealed, unitary structure.

From the station C, the sealed, unitary structure is advanced through a station D wherein the sealed, unitary structure is subjected to a photo-resist etching procedure to expose each conductor lead structure 30–32 by forming craters or cavities 40 (FIGS. 5 and 6) within the upper insulating strip 33, thereby affording access to the conductor lead structures 30–32.

After the exposed conductor lead structures 30–32 leave station D, they are gold plated at a station E in a conventional manner. The unitary structures with exposed gold plated lead conductors 30–32 are placed onto a conveyor 41 for further processing, which includes the placement of semiconductive devices, such as device 42 (FIGS. 9, 10 and 13) in contact with respective conductor lead structures 30–32 (FIGS. 9 and 10), causing the conductor lead structures 30–32 to adhere directly to the respective associated semiconductive devices, and hermetically sealing the semiconductive devices within the associated package units (FIGS. 11–13).

Illustrated in FIG. 1 is the spool 21 with the continuous, unperforated metal ribbon or strip 20 wound therearound. The metal strip 20 is made of Kovar, since Kovar has a desirable thermal coefficient of expansion. Supporting the spool 21 for rotation is a shaft or spindle 43, whereby the metal strip 20 can be drawn from the spool 21. Suitable uprights on a tank 44 support the shaft or spindle 43.

The metal strip 20 is drawn from the spool 21 and is bathed or washed by advancing through a suitable solution contained in the tank 44 located at the washing station A. Suitable rollers 45 and 46 mounted within the tank 44 guide the metal strip 20 in its advancement through the washing station A.

From the washing station A, the metal strip 20 is continuously advanced through a station B where the series of perforations 26 and 27 (FIG. 2) and the series of conductor lead structures 30–32 are formed therein. The foregoing is accomplished at station B through suitable etching or chemical milling. For this purpose, a solution of unpolymerized photosensitive material, such as Kodak KMER, is contained within a tank 50. Mounted within the tank 50 are rollers 51 and 52 and supported by common walls on the tanks 44 and 50 is a roller 53, whereby the metal strip 20 is guided in its advancement from the tank 44 through the tank 50.

The photosensitive material within the tank 50 coats uniformly the surfaces of the metal strip 20 as the metal strip 20 advances through the tank 50. From the tank 50, the metal strip 20 is advanced through an enclosed tank 55. For guiding the advancement of the metal strip 20 to the enclosed tank 55, a roller 56 is supported by common walls on the tanks 50 and 55. Rollers 57 and 58 mounted within the tank 55 guide the metal strip 20 through the tank 55.

Disposed within the tank 55 is the endless mask pattern tape or belt 22 that has a predetermined, successive array of patterns and is trained around suitable rollers 60–63 to be driven thereby in the direction of an arrow 64. A suitable drive mechanism, not shown, rotates one of the rollers 60–63 to impart continuous rotation to the endless belt or tape 22. The speed of travel of the continuous rotation of the endless mark pattern belt or tape 22 is the same as the speed of travel which the metal strip 20 is advanced through the tank 55.

Intermediate the rollers 60–63 is disposed the ultraviolet light 23, which projects its radiation of light waves toward the continuously moving masking pattern belt 22 in the direction of an arrow 65, whereby portions of the photosensitive material coating on the metal strip 20 are subjected to the ultraviolet radiations. The portions of the photosensitive coating on the metal strip 20 that are subjected to the ultraviolet radiations are those portions not blocked out by the endless masking pattern belt or tape 22. Stated otherwise, the masking pattern tape 22 permits or passes the ultraviolet radiation for exposing selected portions of the coating of photosensitive material on the metal strip 20 to ultraviolet radiation. The portions of the coating of the photosensitive material on the metal strip 20 that is exposed or subjected to ultraviolet radiation is polymerized.

When thin coatings of photosensitive material are employed, the need for prebaking may be obviated. Should prebaking be desired, infrared lamps may be used as a heat source before exposing the continuously advancing metal strip 20 to the ultraviolet radiation.

Contained within the tank 55 is a suitable developing solution, such as KMER Developer produced by the Eastman Kodak Co. After the metal strip 20 leaves the tank 55, it is advanced through an enclosed tank 66 containing a water rinse or a fresh solution of KMER Developer. For guiding the metal strip 20 to the tank 66, a roller 67 is supported by common walls of the tanks 55 and 66. To guide the advancement of the metal strip 20 through the tank 66, rollers 67 and 68 are mounted within the tank 66.

After the metal strip 20 leaves the tank 66, it is continuously advanced through a tank 70, which contains a suitable etching solution, such as hydrochloric acid or photoengraver's iron chloride or combinations thereof. A roller 71 is supported by common walls of the tanks 66 and 70 to guide the metal strip 20 into the tank 70. Within the tank 70 are mounted rollers 72 and 73, which guide the metal strip 20 through the tank 70.

The etching solution within the tank 70 serves to remove the unexposed or unpolymerized coating on the metal strip 21. The exposed or polymerized coating on the metal strip 20 masks or resists the chemical etchants. Thus, the portions of the metal strip having the exposed coating thereon will remain intact and the portions of the metal strip with the unexposed coating thereon will be removed or lifted by the chemical etchant.

As the metal strip 20 leaves the tank 70, it enters a tank 75 containing a suitable wash or rinsing solution. Guiding the metal strip 20 from the tank 70 to the tank 75 is a roller 76 that is supported by the common walls of the tanks 70 and 75. Within the tank 75 are guide rollers 77 and 78 for the metal strip 20.

Illustrated in FIG. 2 is the metal strip or sheet 20, which is preferably made of Kovar because of the thermal coefficient expansion of Kovar, which is preferably used when hard boro-silicate glass is used. The metal strip 20 includes the series of equally spaced perforations or holes 26 and 27 along the edges thereof. Specifically, along opposite edges of the metal strip 20 are formed parallel series of equally spaced perforations or holes 26 and 27. Formed in the metal strip 20 intermediate the perforations 26 and 27 are the series of conductor lead structures 30–32. The configurations of the perforations 26 and 27 and the conductor lead structures 30–32 are made possible by the patterns on the masking belt or tape 22.

Each conductor lead structure 30–32 comprises two sets of parallel, spaced leads that extend from opposite edges of the metal strip 20 and are directed at an angle laterally inward toward the center of the metal strip 20. Thus, the lead structure 31 includes a set of transversely extending, longitudinally spaced leads **31*a*–31*e* and a set of transversely extending, longitudinally spaced leads 31*f*–31*j*. At the free ends of the leads, such as leads 31*b*–31*d* and 31*f*–31*j* of the conductor lead structure 31**, are centrally directed projections, which terminate at the central area of the associated conductor lead structure.

The metal strip 20 is cleaned while advancing through the tank 75 for disposition between the upper insulating or dielectric strip 33 and the lower insulating or dielectric strip 34 (FIGS. 3 and 4). It is to be observed that the width of the insulating strips 33 and 34 is less than the width of the conductor lead structure, such as conductor lead structure 30. In addition, the insulating strips 33 and 34 are centrally located relative to the edges of the metal strip 20. In the preferred embodiment, the insulating strips 33 and 34 are made of a hard glass, such as Corning Glass No. 7052.

The metal strip 20 is disposed between the insulating strips 33 and 34 and is retained in a firing jig assembly, not shown, for advancement through the furnace 35 for example, twenty minutes at a furnace temperature of, for example, 925° C. As a consequence thereof, the metal strip 20 is sandwiched and imbedded between the insulating strips 33 and 34 to form a sealed, unitary structure.

The sealed, unitary structure of the conducting strip 20 sandwiched between the insulating strips 33 and 34 is removed from the furnace 35 and advanced through the annealing and cooling chamber 36 until cooled to room temperature.

For drawing the metal strip 20 from the spool 21 and advancing the metal strip 20 toward the furnace 35 and there-beyond, a sprocket 80 (FIG. 1) is mounted on a wall 81 for rotation. Projections on the sprocket 80 are received by the perforations 26 and 27 formed in the metal strip 20 for advancing the metal strip 20.

To drive the sprocket 80, an endless belt 82 is trained therearound, which is also trained around a drive sprocket 83. The sprocket 83 is supported by a post 84 for rotation and is driven by a motor, not shown. Spaced from the strip drive sprocket 80 in the downstream direction is another strip drive sprocket 85. Similarly projections on the sprocket 85 are received by the perforations 26 and 27 formed in the metal strip 20 for advancing the metal strip 20 imbedded between the insulating strips 33 and 34. The sprocket 85 is supported for rotation and driven in a manner previously described for the strip drive sprocket 80.

Upon completion of the formation of the sealed, unitary structure, an acid-resist or etch-resist masking tape 90 (FIG. 1) is drawn from a spool 91 and is applied over the upper surface of the insulating strips 33. The spool 91 is supported for rotation by a shaft 92. Below the spool 91 is a pressure roller 93 that applies a sufficient force to the masking tape 90 to make the same adhere to the upper surface of the insulating strip 33. In the preferred embodiment, the masking tape 90 is made of a solvent resistant material, such as tape No. 853 produced by Minnesota Mining and Mineral Corporation or Mylar. The pattern of the masking tape 90 applied to the insulating strip 33 is such as to permit the formation of the cavity or crater 40 (FIGS. 5 and 6) in the insulating strip 33 to gain access to the interior planar lead array of each of the conductor lead structures 30–32.

After the acid-resist masking tape 90 is applied to the surface of the insulating strip 33 and another solid tape is similarly applied to strip 34, the sealed unitary structure of the conducting strip 20 sandwiched between the insulating strips 33 and 34 is advanced through a suitable etching tank 96 and immersed in a suitable glass etchant solution. In the preferred embodiment, the etchant solution contained in the tank 96 is a 49% solution of hydrofluoric acid and the etching bath time is twenty minutes. The sealed unitary structure for the above-described etching cycle has a thickness in the preferred vicinity of .040 inch.

As a consequence of the just-described step, the etchant solution contained in the tank 96 has selectively removed portions of the insulating strip 33 to form the geometry for the final shape and dimensions of a series of individual package units formed from the sealed, unitary structure with a cavity or crater 40 appearing in the insulating strip 33 above each of the conductor lead structures 30–32. The cavities or craters 40 provide access to the plane of the leads of the respective conductor structure for each package. The Kovar conductor strip 20 including the conductor lead structures 30–32 is capable of resisting the etchant solution contained in the tank 96 and is not altered thereby.

The series of individual package units can be formed from the sealed, unitary structure by the etching procedure at station D. Alternatively, a scoring device 100 and a notching device 101 may be operated at timed or indexed intervals in sequence with the advancement of the sealed, unitary structure to divide the sealed, unitary structures into a series of individual package units. The devices 100 and 101 are supported by a support structure 102.

Also, carried by the support structure 102 for rotation is a roller 103, which guides the sealed, unitary structure into the tank 96. Mounted within the tank 96 for rotation are guide rollers 104 and 105, which guide the sealed, unitary structure in its advancement through the tank 96.

Thus, there is formed a series of respective package units with each package unit comprising a rectangular lower insulating package member, a conductor lead structure, and a rectangular upper insulating package member with a rectangular cavity or region therein afford access to the conductor lead structure sandwiched between the insulating package members.

After the sealed, unitary structure formed into a series of package units leaves the tank 96, it enters a tank 110 containing a rinse or wash solution. As the sealed, unitary structure advances through the tank 110, it is immersed in the solution for a rising bath. Guiding the sealed, unitary structure for advancement into the tank 110 is a roller 111 that is mounted for rotation on the common walls of the tanks 96 and 110. Rollers 112 and 113 mounted within the tank 110 guide the sealed, unitary structure for advancement through the tank 110. A roller 114 on a support structure 115 guides the sealed, unitary structure in its advancement from the tank 110.

The sealed, unitary structure formed in a series of package units advances from the station D into the lead plating station E. Located at the station E is a tank 120 in which gold or other suitable precious metal is plated onto the lead structures 30–32 or the lead arrays for the respective package units of the sealed unitary structure.

Downstream of the gold plating tank 120 is disposed a device 121 that cuts the sealed, unitary structure along the etched separations, scores or notches to form multiple packaging units therefrom. When desired, pretreatment tanks, not shown, may be employed prior to the gold plating in conventional manner. While only three packaging units (FIG. 5) were formed from the sealed, unitary structure for purposes of ease of explanation, it is to be realized that in practice ten or more of such package units may be formed from each sealed, unitary structure.

Independently of the forming of the packaging units, a plurality of semiconductive or microelectronic devices (FIGS. 7 and 8), such as semiconductive device 42 (FIGS. 9, 10 and 13) are produced in a wafer 125 in a well-known and conventional manner. Each of the semiconductive or microelectronic devices will be packaged individually in a separate packaging unit (FIGS. 9 and 10).

The undiced wafer 125 having the semiconductive devices formed therein is covered with an etch-resistant material or a photo-resist material, such as KPR, which is manufactured by the Eastman-Kodak Company. The photo-resist material covering the undiced wafer 125 is exposed and etched in a well-known manner, whereby only the conductor terminal areas on all the semiconductive devices on the wafer surface are unexposed and removed from the photo-resist material and, therefore, appear as holes in a plastic surface film on the wafer surface. Subsequently thereto, a slurry comprising a finely divided solder-alloy in a vehicle, such as amyl-acetate nitrocellulose, is squeegeed over the wafer surface. As a consequence thereof, the wafer surface now comprises a plastic film with solder filled holes at the conductor terminal areas of the semiconductive devices.

Thereupon, the photo-resist layer on the wafer surface is baked off or otherwise removed. The solder-alloy prominences (see FIG. 8) at the terminal points of the semiconductive devices remain and are permanently soldered or wetted to the surfaces of the semiconductive devices at the conductor terminal points in the wafer surface. At this time, the wafer 125 is diced into separate, individual semiconductive devices, such as semiconductive devices 42 (FIGS. 9 and 10).

Each separated diced semiconductive device is now placed reverse side up into the crater or cavity 40 of an associated package unit with the solder-alloy conductor terminal points aligned over the conductor lead array of the associated package unit and in direct contact engagement therewith.

The base of the package unit is now heated to the melting or wetting point of the solder-alloy. As a consequence thereof, the solder alloy prominences of the semi-conductor device adheres directly to the package conductor lead array, such as conductor lead array 32. Thus, the conductor leads of the package units adhere directly and simultaneously to the semiconductive device associated therewith (FIGS. 9 and 10) without any leads or conductors therebetween.

After the foregoing is completed, the package units with the semiconductive devices seated therein are hermetically sealed. For this purpose, a metal strip 130 (FIGS. 11 and 12), such as a Kovar strip, is glazed on one side thereof with a low melting glass or a solder glass. The glazed metal strip 130 is divided into panels or caps of a dimension to fit over the crater surfaces 40 of the package units. The divided glazed metal strip 130 is now aligned over the crater surfaces 40 of the package units in an inert atmosphere. A thermally controlled platen 131 (FIG. 11) is lowered onto the glazed metal strip 130 melting the glass surface thereof to seal the package units substrate, thereby hermetically sealing all the package units in the group. A holding device 132 faces the platen 131. The assembly of ten packaging units is now cut into individual packages containing respectively hermetically sealed semiconductive devices.

As shown in FIGS. 12 and 13, the packaged semiconductive device of the present invention comprises a lower flat rectangularly-shaped insulating base 34 and an upper rectangularly-shaped insulating member 33. The upper insulating member forms a rectangular crater 40 with a flanged periphery or rim. Disposed in sealed imbedded relation between the insulating base 34 and insulating member 33 is the package conductor lead array 31 with parallel leads projecting out of the package. The package leads within the package converge toward the center of the crater.

Seated on the insulating base within the crater is the semiconductive device 42 that is in direct contact engagement with package leads 32 and adheres directly thereto. The sealing cap 130 with glass lower surface confronts the semiconductive device 42. The cap 130 is hermetically sealed to the upper insulating strip 33.

It is recognized that different steps in the process may require different time durations. Under such circumstances corresponding accumulators may be employed in well-known manners to compensate for the time differentials or lags.

From the foregoing, it is to be observed that the present invention provides a process for a continued, serial fed production of microelectronic packages. Through the drive sprockets 83 and 85 being received by the perforations 26 and 27 formed in the metal strip 20, the metal strip 20 and the sealed, unitary structure are continuously, serially, precisely and accurately advanced through the respective stations for processing.

The semiconductive device of the present invention has the terminal areas thereof in direct contact engagement with the package conductor lead array structure and adheres directly thereto. The semiconductor device comprises solder-alloy prominences which are of soft, easily wetting material for permanent adhering to the package conductor lead structure.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A method of packaging microelectronic devices comprising the steps of, covering the surface of a plurality of microelectronic devices on a wafer with a photosensitive material, removing portions of the photosensitive material coinciding with conductor terminal areas of the microelectronic devices to form holes in the photosensitive material coincident with the conductor terminal areas of the microelectronic devices, applying meltable metallic material over said photosensitive material to fill said holes for forming a layer of photosensitive material with meltable metallic filled holes, removing said photosensitive material to leave meltable metallic prominences on said microelectronic devices coincident with the conductor terminal areas of said microelectronic devices, dicing said microelectronic devices on said wafer into separate microelectronic devices, forming recesses in a series of package units for exposing a series of conductor lead arrays imbedded in said package units, disposing said microelectronic devices respectively into the recesses of individual package units with said meltable metallic prominences in direct contact engagement with associated conductor lead arrays, and melting said prominences to bond respective microelectronic devices directly to the associated package units.

2. A method of packaging microelectronic devices comprising the steps of, forming meltable prominences over the terminal areas of a plurality of semiconductor devices, forming recesses in a series of package units for exposing conductor lead arrays imbedded in respective package units, disposing said microelectronic devices respectively in individaul recesses of said package units with the meltable prominences in direct contact engagement with associated conductor lead arrays, melting said prominences to bond said microelectronic devices directly to the associated package units, covering said recesses to seal said microelectronic devices within said package units, and separating said package units to form individual units of packaged microelectronic devices.

3. A method of packaging microelectronic devices comprising the steps of, covering the surfaces of a plurality of microelectronic devices on a wafer with an etch resistant material, removing portions of the etch resistant material coinciding with conductor terminal areas of the microelectronic devices to form holes in the etch resistant material coincident with the conductor terminal areas of the microelectronic devices, applying meltable conductor material over said etch resistant material to fill said holes for forming a layer of etch resistant material with meltable conductor filled holes, removing said etch resistant material to leave meltable conductor prominences on said microelectronic devices coincident with the conductor terminal areas of said microelectronic devices, dicing said microelectronic devices on said wafer into separate microelectronic devices, forming recesses in a series of package units for exposing a series of conductor lead arrays imbedded in said package units, disposing said microelectronic devices respectively into the recesses of individual package units with said meltable conductor prominences in direct contact engagement with associated conductor lead arrays, melting said prominences to bond respective microelectronic devices directly to the associated package units, sealing a cover on said package units over said recesses to enclose said microelectronic devices within said package units, and separating said package units to form individual units of packaged microelectronic devices.

4. A method of packaging microelectronic devices comprising the steps of, covering the surface of a plurality of microelectronic devices on a wafer with a etch-resistant material, removing portions of the etch-resistant material coinciding with conductor terminal areas of the microelectronic devices to form holes in the etch-resistant material coincident with the conductor terminal areas of the microelectronic devices, applying conductor material over said etch-resistant material to fill said holes for forming a layer of etch-resistant material with conductor filled holes, removing said etch-resistant material to leave conductor prominences on said microelectronic devices coincident with the conductor terminal areas of said microelectronic devices, dicing said microelectronic devices on said wafer into separate microelectronic devices, disposing said microelectronic devices respectively into recesses of package units with said conductor prominences in contact with conductor lead arrays of the package units, and bonding said conductor prominences of said microelectronic devices to the conductor lead arrays of the package units.

References Cited

UNITED STATES PATENTS

| | | | |
|---|---|---|---|
| 2,588,439 | 3/1952 | Ward. | |
| 2,613,252 | 10/1952 | Heibel. | |
| 2,985,806 | 5/1961 | McMahon. | |
| 3,057,952 | 10/1962 | Gordon. | |
| 3,065,383 | 11/1962 | Guillemot. | |
| 3,255,511 | 6/1966 | Weissenstern et al. | 29—589 |
| 3,292,240 | 12/1966 | McNutt et al. | 29—577 |
| 3,171,187 | 3/1965 | Ikeda | 29—574 |

OTHER REFERENCES

IBM Tech. Disc. Bull.: vol. 3, No. 12, May 1961, pp. 30 and 31.

WILLIAM I. BROOKS, *Primary Examiner.*

U.S. Cl. X.R.

29—591; 174—68.5; 317—101